United States Patent [19]

Bauer

[11] 4,453,120
[45] Jun. 5, 1984

[54] CONTROL CIRCUIT FOR A GENERATOR
[75] Inventor: Michael E. Bauer, Fond du Lac, Wis.
[73] Assignee: Kohler Co., Kohler, Wis.
[21] Appl. No.: 492,893
[22] Filed: May 9, 1983
[51] Int. Cl.³ .............................................. H02P 9/30
[52] U.S. Cl. ........................................ 322/28; 322/73
[58] Field of Search ...................... 322/27, 28, 29, 32, 322/73

[56] References Cited
U.S. PATENT DOCUMENTS
3,656,051 4/1972 Pratt ...................................... 322/28
3,758,483 9/1973 Ishizaki et al. .................... 322/27 X Primary Examiner—R. J. Hickey
Attorney, Agent, or Firm—Quarles & Brady

[57] ABSTRACT

A control system for a generator for regulating the field current received from an exciter includes a phase control regulator circuit which produces an output voltage having a duty cycle which is proportional to the generator output signal. An oscillator circuit is responsive to the output signal of the phase controlled regulator circuit and produces a pair of controlled circuit pulses whose duty cycle varies accordingly. Control circuit pulses from the oscillator circuit are coupled via a coupling transformer to a rotating current control circuit which controls the generator field current supplied from the exciter in accordance with the oscillator control pulses.

8 Claims, 4 Drawing Figures

CONTROL CIRCUIT FOR A GENERATOR

BACKGROUND OF THE INVENTION

The field of this invention is a.c. generators which are driven by a gasoline or diesel engine and more particularly to a control circuit for an a.c. generator such as that disclosed in U.S. Pat. No. 3,656,051 entitled "Fast Response Feedback Controlled Generator".

In an a.c. generator such as is disclosed in the above-cited patent, the generator output voltage is controlled by regulating the current in the generator field winding. A current control circuit, which physically rotates with the generator shaft, is responsive to feedback signals, varying in accordance with the generator output signal, the feedback signals being supplied to the current control circuit from a stationary feedback circuit through a rotating transformer or an optical transceiver. By regulating the a.c. generator field current in accordance with the a.c. generator output voltage, the current control circuit maintains a constant generator output voltage.

While great care is taken in the design of electronic control circuits and in particular the electronic control circuits for an a.c. generator, it is inevitable that one or more components will occasionally fail. To the extent possible, such control circuitry should be designed so that when a component failure occurs, the electronic circuit fails in a safe mode. In the case of an a.c. generator such as is disclosed in the above cited patent, it is desirable that the output voltage of the a.c. generator drop to a safe level when a component failure in either of the feedback circuit or the current control circuit occurs.

BRIEF SUMMARY OF THE INVENTION

Briefly, in accordance with the preferred embodiment, an improved control circuit for controlling the field current to an a.c. generator in response to a feedback signal indicative of the generator output voltage includes an SCR bridge. The individual SCRs of the bridge are triggered from a synchronizing circuit by the energy provided from a control pulse supplied from the rotating secondary winding of a transformer whose stationary primary windings are energized by a phase control regulator circuit which is responsive to the output voltage of the a.c. generator.

A general object of the present invention is to provide a generator control circuit which regulates the current in the generator field in accordance with the generator output voltage amplitude. This is readily accomplished by the phase control regulator circuit which derives a d.c. voltage component and an a.c. voltage component from the generator output voltage. The phase control regulator circuit provides an output voltage whose phase varies in accordance with the difference in magnitude between the voltage components to the synchronizer circuit of the current control circuit to synchronize the firing SCR's of the bridge of the current control circuit.

Another object of the present invention is to provide an improved coupling transformer for coupling the output signal of the phase control regulator circuit to the current control circuit. The improved coupling transformer includes a secondary winding wound about the rearward end of a hollow bobbin coaxially secured to the generator shaft. The transformer primary is wound around a stationary bobbin which is concentric with the forward end of the rotating bobbin. A core of highly permeable material is disposed within the bore of the rotating bobbin so as to be coaxial with both the rotating and the stationary bobbins to provide a low reluctance path between the primary and secondary windings.

Other objects and advantages of the present invention will appear from the following description.

BRIEF SUMMARY OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIG. 4 is a side elevational view of the improved coupling transformer for coupling signals from the phase control regulator circuit to the current control circuit.

DETAILED DESCRIPTION OF THE PREFERRED EMBODIMENT

Figure 1:
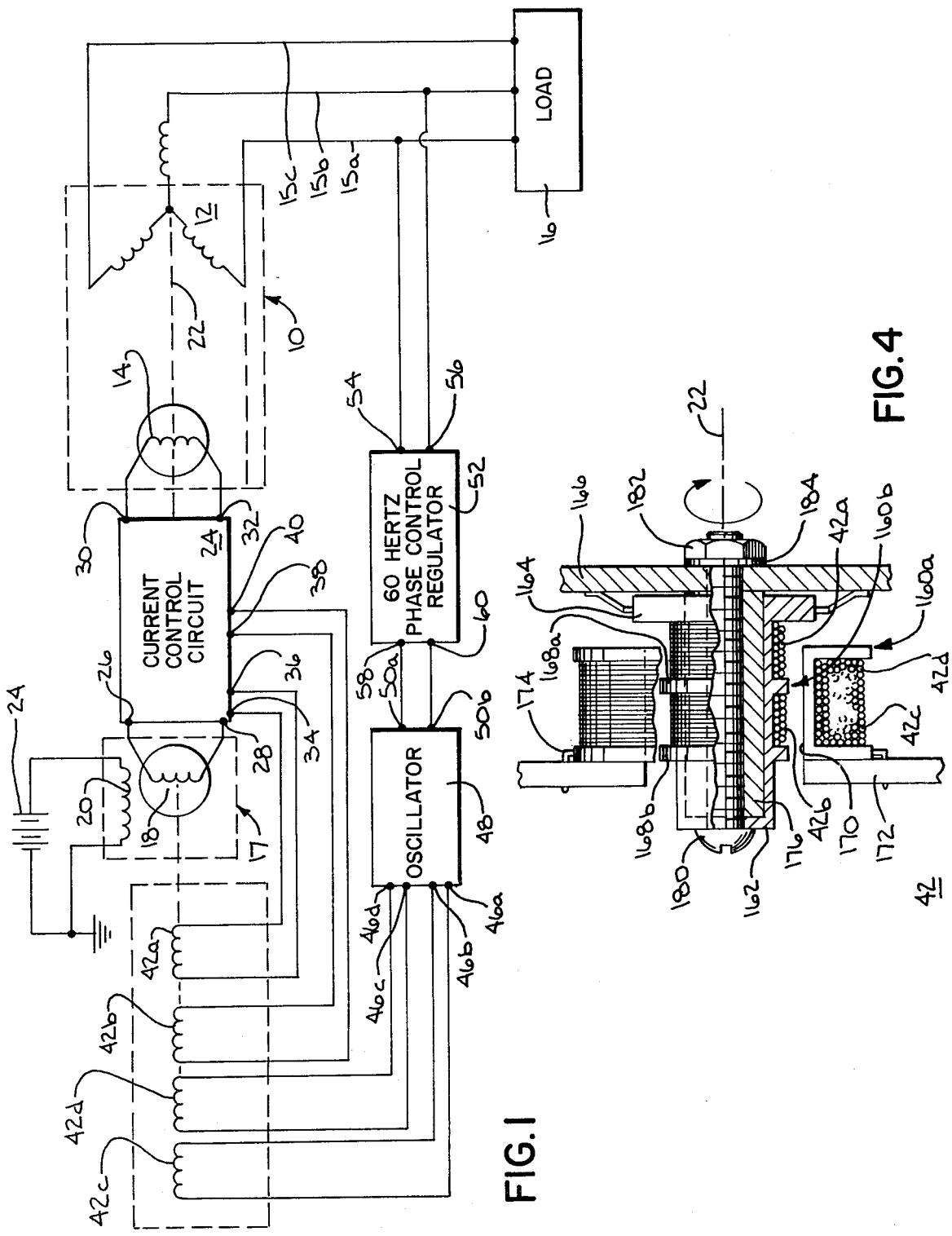
FIG. 1 is a block diagram of the control circuit of the present invention for use on an a.c. generator.

Referring to FIG. 1, an a.c. generator 10 for supplying emergency power to hospitals and communication facilities and for supplying primary power to remote locations is generally comprised of a stationary armature winding 12 and a rotatable field winding 14. When field winding 14 is energized with electrical current and is rotated within the armature winding 12, generator 10 outputs an electrical voltage across the armature winding. In the presently preferred embodiment, generator 10 has a three phase armature winding 12 which supplies three phase electrical current along the output lines 15a, 15b and 15c to a load 16. The magnitude of the a.c. voltage generator across each of the windings of armature winding 12 is determined by several factors, including the magnitude of the excitation current supplied to field winding 14 as well as the rotational speed of the field winding. If the rotational speed of the field winding is held constant and the other factors, with the exception of the field current magnitude, are also held constant, then the output voltage of the generator 10 will depend on the magnitude of the field excitation current so that by controlling the field excitation current, the generator output voltage can be varied accordingly.

The current supplied to field winding 14 is generated by an exciter or generator 17 having a rotatable armature winding 18 and a stationary field winding 20. In practice, the rotatable armature winding 18 of exciter 17 and field winding 14 share a common rotatable shaft 22 which is driven by a diesel or gasoline engine (not shown). The stationary field winding 20 of exciter 17 is typically energized from a fixed d.c. supply such as battery 24. Those skilled in the art will of course recognize that field winding 20 and battery 24 could easily be replaced by a suitable permanent magnet within the exciter concentric about the rotational axis of exciter armature winding 18.

The frequency of the a.c. output voltage of both generator 10 and exciter 17 is dependent on the number of generator poles and the rotational speed of shaft 22. In particular, the output voltage frequency can be determined from the rotational speed and the number of generator poles by the following formula:

$$n \cdot \text{rpm}/120 = f$$

where n is the number of generator poles, rpm is the rotational speed of the driving shaft and f is the output voltage frequency.

Usually, the number of poles and the rotational speed of generator 10 is selected so as to yield the appropriate voltage frequency for load 16. When load 16 requires a driving voltage having a frequency of 60 hertz, generator 10 is usually selected as a four pole generator and is driven at a rotational speed of 1800 rpm. While the output voltage frequency of generator 10 is established by the frequency requirements of load 16, the output voltage frequency of exciter 17 can be set independently since, as will be seen hereinafter, the exciter output voltage is rectified to yield the field voltage which excites field winding 14 of generator 10. Generally speaking, the copper and iron losses of a generator go down and hence generator efficiency increases as the generator frequency increases. For this reason, it is desirable to configure exciter 17 with a large number of poles to achieve a very high output voltage frequency. In practice, exciter 17 is configured as a 24 pole machine so that the resultant output voltage frequency is 360 hertz. Since many electronic components are rated for 400 hertz operation, it is thus not desirable to attempt to increase the number of poles of the exciter beyond 24 so as to achieve higher frequency operation.

Control of the current supplied from exciter 17 to field winding 14 of generator 10 is accomplished by a current control circuit 24 (described hereinafter) with respect to FIG. 3 which has a pair of input terminals 26 and 28 each coupled to a separate one of the terminals of rotating armature winding 18 of the exciter and has a pair of output terminals 30 and 32 each coupled to a separate one of the terminals of field winding 14 of generator 10. As will become better understood by reference to FIG. 3, current control circuit 24 varies the current supplied to field winding 14 of generator 10 from exciter 17 so as to control the magnitude of the output voltage of generator 10.

The magnitude of current supplied from the exciter to the generator field winding is controlled by control circuit 24 in accordance with the control signal pulses supplied to each of a separate pair of inputs 34 and 36 and 38 and 40 from a pair of secondary windings 42a and 42b, respectively, of a transformer 42. In practice, both of secondary windings 42a and 42b and control circuit 24 rotate co-jointly on shaft 22 with field winding 14 of generator 10 and armature winding 18 of exciter 17.

Both of rotating transformer secondary windings 42a and 42b are co-axial with a pair of stationary transformer primary windings 42c and 42d. Transformer primary windings 42c and 42d are magnetically linked to transformer secondary windings 42a and 42b so that when an alternating current is present in primary windings 42c and 42d, an alternating current is induced in secondary windings 42a and 42b so as to supply current control circuit 24 with a pair of control pulses at control circuit inputs 34 and 36 and 38 and 40 respectively. The transformer windings 42c and 42d are each coupled to a separate one of a pair of output terminals 46a and 46b and 46c and 46d of an oscillator 48. Oscillator 48, described in greater detail with respect to FIG. 2, produces a pair of alternating current voltages at its output terminals 46a and 46b, and 46c and 46d in accordance with the duty cycle of the signal at the oscillator input terminals 50a and 50b.

Figure 2:
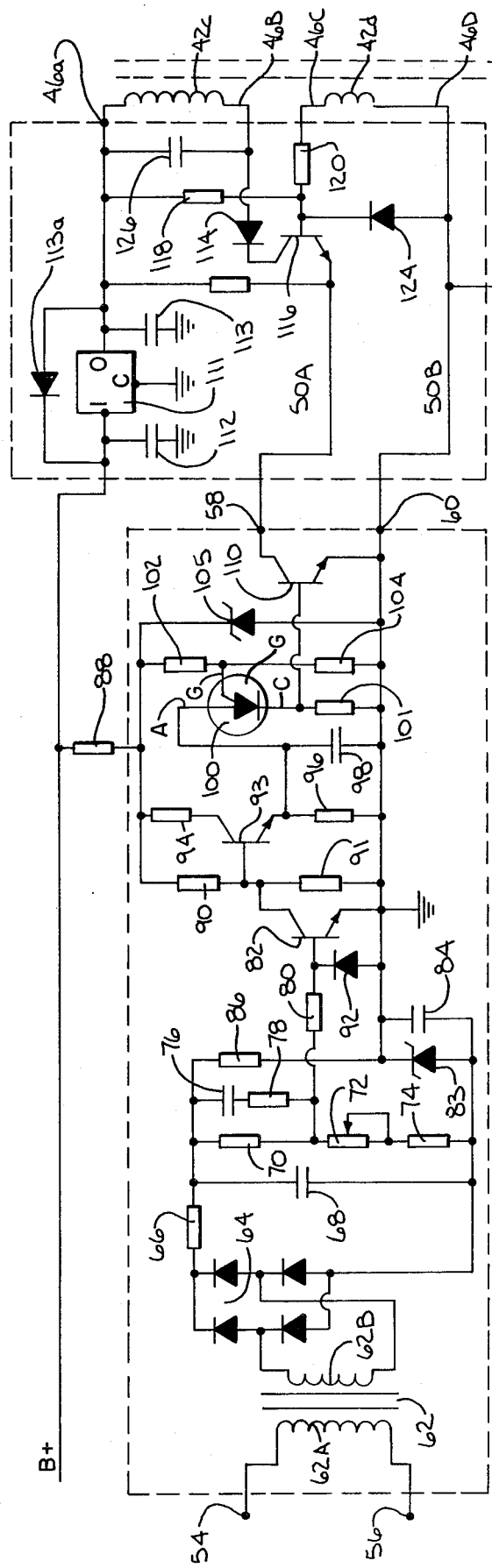
FIG. 2 is an electrical schematic diagram of the phase control regulator circuit and the oscillator circuit which forms a part of the control circuit of the present invention.

A 60 hertz phase control regulator 52, described in greater detail with respect to FIG. 2, has a pair of input terminals 54 and 56 coupled to separate one of lines 15a and 15b so as to be supplied with one of the three phase output voltages of generator 10. Phase control regulator circuit 52 has a pair of output terminals 58 and 60 coupled to input terminals 50a and 50b of oscillator 48 so as to supply the oscillator with a control signal whose duty cycle varies in accordance with the magnitude of the input voltage at terminals 54 and 56 of the phase control regulator 52. Since the oscillator output duty cycle varies in accordance with the duty cycle of the control signal of the 60 hertz phase control regulator 52, which in turn varies in accordance with the magnitude of the generator output voltage, the alternating current signal induced in secondary windings 42a and 42b of transformer 42 and hence the control signals supplied at inputs 34 and 36 and 38 and 40 of the current control circuit will also vary in accordance with the magnitude of the generator output voltage. As described earlier, the current control circuit 24 regulates the amount of current supplied from exciter 17 to the field winding 14 of generator 10 in accordance with the control pulses provided thereto so that by varying the duty cycle of the control pulses at the current control circuit inputs 34 and 36 and 38 and 40 in accordance with the generator output voltage, the current control circuit will vary the field current in field winding 14 accordingly.

Referring now to FIG. 2, the phase control regulator circuit 52 includes a step down transformer 62 having a primary winding 62a whose two terminals form the phase regulator circuit input terminals 54 and 56. When terminals 54 and 56 are supplied with one phase of the 3 phase generator output voltage, a proportionately smaller voltage appears across the transformer secondary winding 62b. The induced voltage in transformer secondary winding 62b is rectified by a full wave rectifier bridge 64 to yield a DC voltage proportional in amplitude to the magnitude of the AC input voltage appearing across terminals 54 and 56. A resistance 66 is coupled in series with a capacitance 68 across the output of the full wave rectifier bridge 64 to current-limit and to smooth the DC output voltage produced thereby. Although the resistance 66 and capacitance 68 tend to smooth the voltage appearing across the components, the voltage appearing across the capacitance does not appear as a true d.c. voltage. Rather, the voltage appearing capacitance 68 has a d.c. component and an a.c. component superimposed on the d.c. component.

An attenuating network is comprised of a resistance 70, a potentiometer 72 and a resistance 74 which are serially coupled across capacitance 68. The voltage appearing across potentiometer 72 and resistance 74 is thus attenuated from that voltage appearing across capacitance 68. The resistance 70 of the attenuating network is shunted by a R-C filter network comprised of a capacitance 76 and a resistance 78. This R-C filter network shunts high frequency signals from resistance 70, thereby making the attenuating network frequency dependent, which increases the transient response of the regulator.

A resistance 80 couples the junction of resistance 70 and potentiometer 72 to the base of a transistor 82 so that the transistor 82 is supplied with the output voltage of the frequency-dependent attenuating network. The voltage across capacitance 68 is also supplied to a reference voltage supply which includes a Zener diode 83 shunted by a capacitance 84, and a resistance 86 serially coupled with Zener diode 83 and capacitance 84 across the capacitance 68. The junction between resistance 86 and Zener diode 83 and capacitance 84 is coupled to circuit ground and to the emitter of transistor 82.

Resistances 88 and 90 are coupled in series between the B+ supply, such as battery 24, of FIG. 1, and the collector of transistor 82. When the voltage of the frequency dependent attenuating network, which appears at the junction between resistance 70 and potentiometer 72, exceeds the voltage of the reference power supply, formed by Zener diode 83, capacitance 84 and resistance 86, then transistor 82 is rendered conductive. If, however, the output voltage of the frequency dependent attenuator network is below the voltage of the voltage of the reference power supply, then transistor 82 remains nonconductive. A diode 92 shunts the base-emitter junction of the transistor 82 to limit the reverse voltage that can be applied to the transistor base-emitter junction to prevent transistor damage.

A transistor 93 has its base coupled to the junction between resistances 90 and 91 so as to be supplied with a base current during intervals when transistor 82 is not conductive. The collector of transistor 93 is coupled via a resistance 94 to the junction between resistances 88 and 90 and the emitter of transistor 93 is coupled via a resistance 96 to circuit ground. A capacitance 98 shunts resistance 96 to form an integrator circuit which is charged during intervals while transistor 82 is nonconductive and transistor 93 is conductive.

Coupled to the junction between the emitter of transistor 93 and resistance 96 and capacitance 98 is the anode of a programmable uni-junction transistor 100. The cathode of uni-junction transistor 100 is coupled via a resistance 101 to circuit ground and the gate of uni-junction transistor 100 is coupled to the junction between resistances 102 and 104 which are serially coupled between resistance 88 and circuit ground. Shunting the resistances 102 and 104 is a Zener diode 105 which establishes a reference level voltage. The resistance 102 and 104 act as a voltage divider to supply a portion of the reference voltage set by diode 105 to the gate of the uni-junction transistor. When the voltage of the integration network formed by resistance 96 and capacitance 98 exceeds the voltage at the gate of the uni-junction transistor, then the programmable uni-junction transistor becomes conductive to establish a low resistance circuit path between its anode and cathode.

While uni-junction transistor 100 is conductive, base drive current is supplied to the base of a transistor 110 which is coupled to the programmable uni-junction transistor cathode. The collector and emitter terminals of transistor 110 form the phase control regulator output terminals 58 and 60 so that while the base-emitter junction of transistor 110 is forward biased, and the transistor 110 collector-base junction is reversed biased, a low resistance path appears across the collector-to-emitter portion of the transistor 110.

Programmable unit junction transistor 100 remains conductive for so long as transistor 93 is conductive, thereby keeping transistor 110 conductive. However, once transistor 93 becomes non-conductive as occurs when transistor 82 is rendered conductive, then, no current is present at the anode of the programmable uni-junction transistor causing the programmable uni-junction transistor to become nonconductive. Once transistor 100 becomes nonconductive, transistor 110 is starved of base current and therefore remains nonconductive until transistor 82 once again becomes nonconductive.

As can now be appreciated, the conduction angle of transistor 110 is established by the conduction angle of uni-junction transistor 100 which is established by the conduction angle of transistor 82. The conduction angle of transistor 82 is dependent on the ripple voltage of the full wave rectifier bridge 64. Since the ripple in the output voltage of full wave rectifier bridge 64 is dependent upon the magnitude of the AC input voltage across primary winding 62a, the conduction angle of transistor 110 is thus proportional to the generator output voltage magnitude.

The oscillator 48 comprises a voltage regulator 111 whose input terminal I and common terminal C are each coupled to the positive terminal (B+) of a DC supply (such as battery 24) and circuit ground, respectively. A capacitance 112 shunts the input terminal I and common terminal C of the voltage regulator to filter the incoming DC voltage. The output terminal O of the voltage regulator 111, which is shunted via a capacitance 113 to circuit ground, forms output terminal 46a of the oscillator which is coupled to one of the terminals of primary winding 42c of transformer 42. A diode 113a shunts the input terminal I and output terminal O of the regulator 110 to clamp the regulator voltage in the reverse direction. The other of the terminals of primary winding 42c of transformer 42 is coupled to the anode of a diode 114 which forms the oscillator output terminal 46b. The cathode of diode 114 is connected to the collector of a transistor 116 whose emitter forms input terminal 50a of the oscillator which, as indicated previously, is connected to terminal 58 of the regulator circuit which in actuality is the collector of transistor 110. The base of transistor 116 is coupled via a resistance 118 to the output terminal O of voltage regulator 111. When transistor 110 of the regulator circuit 52 is rendered conductive to provide a completed circuit path thereacross, then a completed circuit path for the base current in transistor 116 is provided, causing transistor 116 to be forward biased so that the transistor provides a completed circuit path between secondary winding 42c and the collectors of transistor 110. A resistance 118 is coupled between the terminal O of the voltage regulator and the base of transistor 116 to initially start the oscillator.

The base of transistor 116 is also coupled to one terminal of a resistance 120 whose opposite terminal forms the oscillator output terminal 46c which is coupled to one of the two terminals of primary winding 42d of transformer 42. The other of the terminals of transformer secondary winding 42d is coupled to the juncture of the anode of diode 124 and circuit ground, which juncture forms the oscillator output terminal 46d. Diode 124 is coupled at its cathode to the base of transistor 116 and serves to provide a completed circuit path for current in winding 42d when transistor 116 is nonconductive.

In operation, when transistor 110 of regulator circuit 52 is rendered conductive to provide a completed circuit path for base current in transistor 116, transistor 116 becomes forward biased and current begins to build in transformer primary winding 42c. The build-up of current in transformer primary winding 42c causes current to be induced in transformer primary winding 42d. The current induced in transformer winding 42d is supplied to the base of transistor 116 through current limiting resistor 120 so as to saturate the transistor.

After transistor 116 becomes saturated, the current in primary winding 42c eventually levels off so that no further current is induced in primary winding 42d. The reduction of current in transformer primary winding 42d causes the base current of transistor 116 to decrease in magnitude so that the transistor comes out of saturation. With transistor 116 no longer in saturation, the current in transformer primary winding 42c begins to fall causing a negative current (as measured with respect to circuit ground) to be induced in transformer primary winding 42d. The negative current in transformer winding 42d forces the base of transistor 116 to become more negative than the transistor emitter by at least 0.7 volts so that the transistor becomes nonconductive.

With transistor 116 now nonconductive, the current in transformer primary winding 42c changes abruptly, inducing voltage spikes in the secondary windings. Although much of the current in the winding 42c is effectively removed by the current in transformer windings 42a and 42b some current remains in transformer winding 42c. Because winding 42c is shunted by the capacitance 126, the winding and the capacitance form an LC circuit which causes the remaining current to ring about primary winding 42c and capacitance 126. The current ringing back in the tuned LC circuit formed by primary winding 42c and capacitance 126 eventually causes base current in transistor 116 to render the transistor conductive once again to repeat the entire process. However, should transistor 110 of phase control regulator circuit 52 become nonconductive, then no path for the base current of transistor 116 is provided so that the transistor cannot become conductive, preventing any oscillations.

Figure 3:
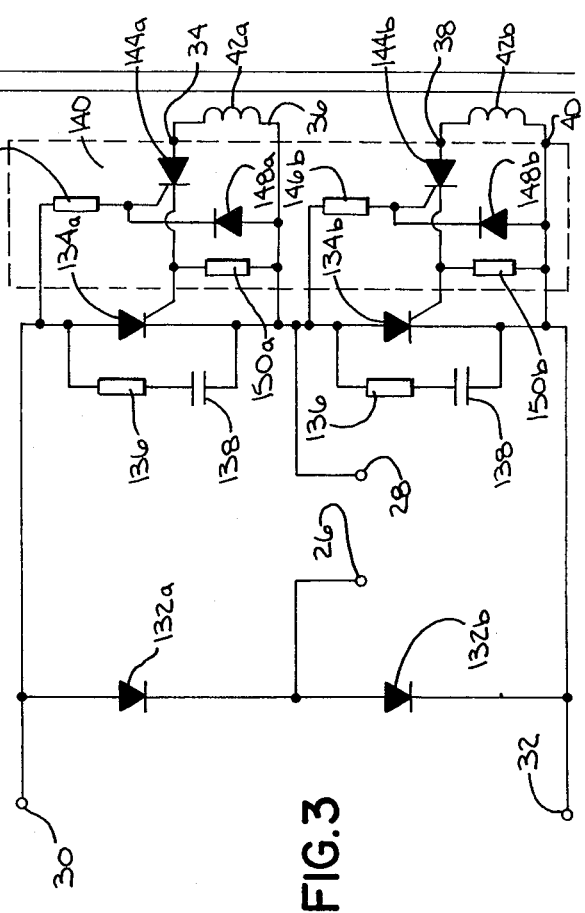
FIG. 3 is an electrical schematic diagram of the current control circuit forming a part of the control system of the present invention.

The details of current control circuit 24 are illustrated in FIG. 3. The current control circuit includes a power bridge 130 comprised of a pair of diodes 132a and 132b coupled in series aiding fashion between the output terminals 30 and 32 of the current control circuit which, as will be recalled, are each connected to a separate one of the terminals of the field winding 14. The junction between diodes 132a and 132b is coupled to the current control circuit input terminal 26 which is coupled to one terminal of exciter armature winding 18. A pair of silicon controlled rectifiers (SCR's) 134a and 134b are coupled in series aiding fashion across the current control circuit output terminals 30 and 32 so as to be in parallel with diodes 132a and 132b. The junction between silicon control rectifiers 134a and 134b is coupled to the remaining input terminal 28 of the current control circuit which is connected to the remaining terminal of armature winding 18. Each of silicon control rectifiers 134a and 134b is shunted by a snubber circuit comprised of a resistance 136 in series with a capacitance 138 to prevent voltage spikes from inadvertently triggering each SCR.

Each of silicon control rectifiers 134a and 134b is rendered conductive during alternate intervals by a sychronizing circuit 140 so that the silicon controlled rectifiers each conduct selected portions of the incoming 360 hertz alternating circuit produced by the excitor 17 into field winding 14 of generator 10 in accordance with the control signal pulses induced in secondary windings 42a and 42b of coupling transformer 42. Synchronizing circuit 140 includes a pair of silicon control rectifiers 144a and 144b which are each coupled at their respective anode to a separate one of the current control circuit control inputs 34 and 38 which are each coupled to one of the two terminals of each of secondary windings 42a and 42b of transformer 42. The cathode of each of silicon controlled rectifiers 144a and 144b is coupled to the gate of a respective one of silicon controlled rectifiers 134a and 134b. The gate of silicon control rectifier 144a is coupled to the junction of resistance 146a and a diode 148a coupled in series opposing fashion across the anode and cathode of silicon control rectifier 134a. The gate of silicon control rectifier 144b is coupled to the junction between resistance 146b and diode 148b which are coupled in series opposing fashion across the anode and cathode of silicon controlled rectifier 134b. The control input 36 of the current control circuit is coupled to the remaining terminal of secondary winding 42a, and is connected to the cathode of silicon controlled rectifier 134a. A resistance 150a connects the gate of silicon controlled rectifier 134a to the juncture of the anode of diode 148a and the cathode of SCR 134a. The current control circuit input terminal 40, which is coupled to the remaining terminal of secondary winding 42b of transformer 42, is connected to the cathode of silicon controlled rectifier 134b and to one terminal of a resistance 150b which is connected as the other terminal to the gate of silicon controlled rectifier 134b.

The synchronizing circuit 140 alternately gates silicon controlled rectifiers 134a and 134b into conduction in accordance with the control circuit pulses induced in secondary windings 42a and 42b as follows. When the input voltage at control circuit input terminal 26 is positive with respect to the input voltage of control circuit input terminal 28, then the silicon control rectifier 144a is supplied with a positive gate current and becomes conductive. With silicon controlled rectifier 144a conductive, if a control pulse is induced in secondary winding 42a, then the pulse is gated through silicon controlled rectifier 144a to render silicon controlled rectifier 134a conductive to provide a completed circuit between the exciter 17 and field winding 14. Once silicon controlled rectifier 134a becomes conductive, current is diverted from the gate of silicon controlled rectifier 144a to render silicon controlled rectifier 144a nonconductive. However, should no control pulse be present in secondary winding 42a, then no gate current is present at the gate of silicon control rectifier 134a so that silicon controlled rectifier 134a remains nonconductive.

While the voltage at current control input circuit terminal 26 is positive with respect to the voltage at current control circuit input terminal 28, silicon controlled rectifier 134b is reverse biased. With silicon controlled rectifier 134b reverse biased, then current is present in diode 148b and resistance 146 to reverse bias the gate of silicon controlled rectifier 144b to keep both silicon controlled rectifiers nonconductive. This prevents remote base transistor operation of the reversed biased SCR 134b.

During intervals when the input voltage at the current control circuit input terminal 28 is positive with respect to the voltage at the current control input circuit terminal 26, then the gate of silicon controlled rectifier 144b is forward biased so that a control pulse induced in secondary winding 142b will cause silicon control rectifier 134b to become conductive. Once silicon controlled rectifier 134b becomes conductive, silicon controlled rectifier 134b diverts the gate current from silicon controlled rectifier 144b to render silicon controlled rectifier 144b nonconductive. During the interval that silicon controlled rectifier 134b was forward biased, silicon controlled rectifier 134a was reverse biased and prevented from conducting by the presence of current in diode 148a and resistance 146a. This prevents remote base transistor operation of SCR 134a.

As can now be appreciated, the synchronizing circuit 140 effectively synchronizes the conduction of silicon controlled rectifiers 134a and 134b to the frequency of controlled pulses induced in secondary windings 42a and 42b while preventing the likelihood of simultaneous conduction of both silicon controlled rectifiers 134a and 134b. When no controlled pulses are induced in either of the secondary windings 42a and 42b, then both of the silicon controlled rectifiers 134a and 134b remain nonconductive. Thus, should any of the components of the phase controlled regulator circuit 52 or oscillator circuit 48 fail, so as to prevent control signals from being induced in secondary windings 42a and 42b, then no current will be switched from the exciter into the field winding 14 of generator 10.

The details of coupling transformer 42 are illustrated in FIG. 4. The coupling transformer 42 includes a stationary element 160a and a rotating element 160b which rotates cojointly with shaft 22. The rotating element 160b comprises a hollow cylindrical member 162 whose base is integrated to a plate 164 which is fastened to a circuit board 166 secured to shaft 22 for rotation therewith. Cylindrical member 162 has a pair of parallel, spaced-apart shoulders 168a and 168b. Shoulder 168a separates transformer secondary winding 42a, which is wound about cylindrical member 162 between shoulder 168a and plate 164, from secondary winding 42b which is wound on the cylindrical member between shoulders 168a and 168b.

Stationary element 160a of transformer 42 comprises a bobbin 170 having a bore therethrough dimensioned to receive the cylindrical member 162 of rotating element 160b. Bobbin 170 is physically secured to a stationary circuit board 172, typically by having its mounting tabs 174 soldered thereto. The windings 42c and 42d are both wound on bobbin 170 with the windings 42d being wound on the bobbin first and 42c being wound on top of winding 42d.

As illustrated in the cut-away portion of cylindrical member 162, a magnetically permeable core 176 is disposed within the bore of cylindrical member 162 to provide a low reluctance path between primary windings 42c and 42d on bobbin 170 and secondary windings 42a and 42b on the cylindrical member 162. The core element 176 is firmly held within the base of cylindrical member 162 by a screw 180 which extends through the cylindrical member 162 and core 176 and beyond circuit board 166. A nut 182 is threaded onto the end of screw 180 extending beyond circuit board 166 to bear against a washer 184 carried on the extending end of the screw between nut 182 and circuit board 166.

The foregoing discloses an improved control system for a motor driven a.c. generator for advantageously regulating the amount of field excitation supplied to the generator from an exciter in accordance with the generator output voltage.

While only certain preferred features of the invention have been shown by way of illustration, many modifications and changes will occur to those skilled in the art. It is therefore to be understood that the appended claims are intended to cover all such modifications and changes as may fall within the true spirit of the invention.

What is claimed is:

1. A feedback controlled generator comprising:
   a generator having a rotating field winding and a stationary armature winding which generates an output voltage proportional to the magnitude of current in said field winding;
   an exciter having an armature winding which rotates co-jointly with the generator field winding for producing an exciter voltage;
   a current control circuit mounted to rotate co-jointly with the generator field winding and exciter armature winding for regulating the amount of current supplied to said generator field winding from said exciter armature winding in accordance with control pulses supplied to said control circuit;
   a phase control regulator responsive to the output voltage generated in said generator armature and producing an output signal whose phase varies in accordance with the generator output voltage;
   an oscillator coupled to said phase control regulator for generating control pulses in accordance with the duty cycle of the input signal supplied thereto from said phase control regulator; and
   a coupling transformer having a pair of stationary windings coupled to said oscillator and having a pair of secondary windings attached to rotate with said current control circuit and said secondary windings being electrically coupled to said current control circuit so as to couple the pulses induced in said primary winding by said oscillator to said current control circuit so that said current control circuit regulates current supplied to said generator field winding from said exciter armature winding in accordance with the magnitude of the generator output voltage.

2. The invention according to claim 1 wherein said current control circuit comprises:
   a power bridge including
      a pair of diodes coupled in series aiding fashion across said generator field winding and coupled at the junction between diodes to one of the terminals of said exciter armature winding;
      a pair of power bridge silicon controlled rectifiers coupled in series aiding fashion across said generator field winding and coupled at the junction between silicon controlled rectifiers to the other of the terminals of said exciter armature winding; and
   a synchronizing circuit coupled to each of said silicon controlled rectifiers and coupled to each of said secondary windings of said coupling transformer for alternately rendering the silicon controlled rectifiers of said pair of power bridge silicon controlled rectifiers conductive in accordance with energy supplied from control pulses alternately induced in a separate one of said pair of coupling transformer secondary windings by said oscillator.

3. The invention according to claim 2 wherein said synchronizing circuit comprises:
   a first synchronizing silicon controlled rectifier coupled between a first one of said pair of secondary windings of said couplings transformer and the gate of one of said pair of silicon controlled rectifiers of said bridge circuit;
   a second synchronizing silicon controlled rectifier coupled between the other of said pair of secondary windings of said coupling transformer in the gate of the other of said pair of silicon controlled rectifiers of said bridge circuit;
   a first resistance coupled between the gate of said first synchronizing silicon controlled rectifier and the first of said pair of power bridge silicon controlled rectifiers for conducting current into the gate of said synchronizing silicon controlled rectifier so that said synchronizing silicon controlled rectifier will pass control signals from said first of said coupling transformer secondary windings to the gate of the first of said pair of power bridge said silicon controlled rectifiers to render said first of said pair of power bridge silicon controlled rectifiers conductive;
   a second resistance coupled between the gate of said second synchronizing silicon controlled rectifier and the other of said pair of said silicon controlled rectifiers of said power bridge for conducting current to the gate of said second of said power bridge silicon controlled rectifiers so that said synchronizing second silicon controlled rectifier passes control pulses induced in the other of said pair of coupling transformer secondary windings to render the other of said pair of power bridge silicon controlled rectifiers conductive;
   a first diode coupled between said gate of said first synchronizing silicon controlled rectifier and the junction of said pair of power bridge silicon controlled rectifiers for maintaining a negative potential on the gate of said first synchronizing silicon controlled rectifier when said first of said pair of power bridge silicon controlled rectifiers is reverse biased; this is to prevent remote base transistor action when the first said SCR is reverse biased; and
   a second diode coupled between the gate of said second synchronizing silicon controlled rectifier and the other of said pair of said power bridge silicon controlled rectifiers for maintaining a negative potential at the gate of said second synchronizing silicon controlled rectifiers when said second of said power bridge silicon controlled rectifiers are reverse biased to prevent remote base transistor action.

4. The invention according to claim 1 wherein said phase control regulator circuit comprises:
   a step-down transformer having a primary winding and a secondary winding, said primary winding being supplied with a voltage proportional to the generator armature voltage so as to induce a proportionately smaller voltage in said secondary winding;
   a rectifier circuit having a pair of input terminals coupled to a separate one of the terminals of said step-down transformer secondary winding and said rectifier circuit having a pair of output terminals across which appear a d.c. voltage whose magnitude is proportional to the magnitude of the voltage at the input terminals of said rectifier circuit;
   a filter coupled across the output terminals of said rectifier circuit for smoothing the d.c. output voltage of said rectifier circuit;
   a voltage divider network having a pair of input terminals coupled to said filter and providing an attenuated d.c. voltage across a pair of output terminals;
   a first switching circuit coupled to the output terminals of said voltage divider network, said first switching circuit including a first transistor which is supplied at its base with a voltage which is proportional to the ripple of the output voltage of said rectifier bridge;
   a second switching circuit coupled to said first switching circuit, said second switching circuit including a second transistor which is rendered conductive during intervals when the transistor of said first switching circuit is rendered nonconductive;
   a third switching circuit coupled to said second switching circuit, said third switching circuit including a programmable uni-junction which is rendered conductive at a frequency proportional to the conduction rate of said transistor of said second switching circuit; and
   a fourth switching circuit coupled to said third switching circuit for providing an output voltage whose frequency is proportional to the conduction frequency of the programmed uni-junction transistor of said third switching circuit and hence to the ripple magnitude.

5. The invention according to claim 1 wherein said coupling transformer comprises:
   a rotating element including
      a hollow cylindrical member about which said first and second transformer secondary windings are wound;
      a magnetically permeable cord disposed within said cylindrical member;
      a base integrated to said cylindrical member and secured for cojoint rotation with said generator field winding and said exciter armature winding; and
   a stationary element configured of a bobbin concentric with said cylindrical member, said bobbin carrying said first and second transformer primary windings so that said primary windings are magnetically linked to said secondary windings.

6. In a feedback controlled generator system comprised of a generator having an armature and a rotary field winding, an exciter having a rotary armature winding for supplying current to said generator field winding, a rotary current control circuit having a power bridge comprised of silicon controlled rectifiers for passing the current from the exciter to the generator, a stationary control circuit for generating an output signal whose duty cycle varies in accordance with generator output voltage, the improvement comprising:
   a control signal coupling transformer having a pair of stationary primary windings each coupled to said stationary control circuit and a pair of secondary windings rotating with said generator field, said control signal transformer secondary windings each being coupled to said rotary current control circuit to supply the current circuit silicon control rectifiers with the necessary firing energy in accordance with the current induced in each of said secondary windings by the current in each of said primary windings.

7. In a feedback controlled generator system including a generator having an armature winding and a rotating field winding, an exciter having an armature winding which rotates co-jointly with said generator field winding, a rotating current control circuit for controlling the current supplied to said generator field winding from said exciter in response to control pulses supplied thereto and a coupling transformer for coupling control pulses to said current control circuit to control the current supplied from the exciter to the generator field; the improvement comprising:

a phase control regulator circuit for deriving an a.c. voltage component and a d.c. voltage component from the generator output voltage and for producing an output signal whose duty cycle changes in accordance with the difference between the derived a.c. and d.c. voltage components; and an oscillator coupled between said phase control regulator circuit and said coupling transformer for inducing an alternating current in said coupling transformer in accordance with the phase control regulator circuit output signal.

8. In a feedback generator system comprised of a generator having an armature and a rotating field winding, an exciter having a rotating armature winding which produces an alternating frequency voltage at a frequency higher than the output voltage of said generator, a regulator circuit for producing control signals varying in accordance with the generator output voltage and a current control circuit including silicon control rectifiers for passing current from said exciter to said generator field, the improvement comprising:

a synchronizing circuit within said current control circuit for synchronizing the conduction of the silicon control rectifiers in accordance with said control pulses so that said higher frequency exciter voltage is converted into a lower frequency voltage to exciter said generator field.

* * * * *

UNITED STATES PATENT AND TRADEMARK OFFICE
CERTIFICATE OF CORRECTION

PATENT NO. : 4,453,120
DATED      : June 5, 1984
INVENTOR(S) : Michael E. Bauer

It is certified that error appears in the above—identified patent and that said Letters Patent is hereby corrected as shown below:

| | |
|---|---|
| Column 2, line 47, | "generator" should be -- generated -- |
| Column 5, line 50, | "resistance" should be -- resistances -- |
| Column 6, line 53, | "collectors" should be -- collector -- |
| Column 9, line 6, | "142b" should be -- 42b -- |
| Claim 3, line 7 | "couplings" should be -- coupling -- |
| Claim 6, line 67 | after "current" -- control -- should appear |
| Claim 8, line 21 | "exciter" should be -- excite -- |

Signed and Sealed this

Nineteenth Day of February 1985

[SEAL]

Attest:

DONALD J. QUIGG

Attesting Officer — Acting Commissioner of Patents and Trademarks